United States Patent [19]

Okada

[11] Patent Number: 5,020,963

[45] Date of Patent: Jun. 4, 1991

[54] DEVICE FOR CLAMPING CONTAINER

[75] Inventor: Minoru Okada, Suita, Japan

[73] Assignee: Osaka Taiyu Co., Ltd., Osaka, Japan

[21] Appl. No.: 444,514

[22] Filed: Dec. 1, 1989

[30] Foreign Application Priority Data

Dec. 6, 1988 [JP] Japan ................................ 63-159317

[51] Int. Cl.[5] ................................................ B65G 7/00

[52] U.S. Cl. .................................... 414/607; 414/621; 294/31.1

[58] Field of Search ............... 414/607, 619, 620, 624, 414/911, 90, 445, 450, 406, 408, 409; 294/31.1, 34

[56] References Cited

U.S. PATENT DOCUMENTS

| | | | |
|---|---|---|---|
| 2,704,167 | 3/1955 | Framhein | 414/445 X |
| 2,842,275 | 7/1958 | Kughler . | |
| 2,848,128 | 8/1958 | Thompson . | |
| 3,319,815 | 5/1967 | Vik . | |
| 3,363,929 | 1/1968 | Nelson | 414/619 X |
| 3,448,880 | 6/1969 | Howard . | |
| 3,971,485 | 7/1976 | Hoppey | 414/607 X |
| 4,029,230 | 6/1977 | Bolovc | 414/607 X |
| 4,272,220 | 6/1981 | Garcia | 414/607 |
| 4,718,816 | 1/1988 | Kwg | 414/607 X |

FOREIGN PATENT DOCUMENTS

| | | |
|---|---|---|
| 1025336 | 2/1957 | Fed. Rep. of Germany . |
| 1228563 | 11/1966 | Fed. Rep. of Germany . |
| 1294283 | 4/1989 | Fed. Rep. of Germany . |
| 2077697 | 5/1971 | France . |
| 2228713 | 6/1974 | France . |

*Primary Examiner*—David A. Bucci
*Assistant Examiner*—Craig Slavin
*Attorney, Agent, or Firm*—Arnold B. Silverman; Suzanne Kikel

[57] ABSTRACT

A device for clamping container comprises a support frame positionable around the container over approximately one half of the circumference thereof, a pair of substantially horizontal support rods provided on the inner side of the frame in the vicinity of respective opposite ends thereof, and a pair of claw plates mounted on the respective support rods upwardly and downwardly rotatable. The support rods extend away from each other in a horizontal plane toward their front ends. The claw plates have inwardly curved edges opposed to each other for the body of the container to partly fit in and each have an upper surface positioned at a higher level than the support rod. The shortest distance between the claw plates through the center of the container corresponds to the diameter of the container body, and the distance between the front ends of the claw plates is smaller than the diameter. The body of the container can be clamped as by embracing merely by pushing the device against the container and is releasable merely by retracting the device from the container without necessitating any cylinder device or other drive source.

14 Claims, 6 Drawing Sheets

DEVICE FOR CLAMPING CONTAINER

FIELD OF THE INVENTION

The present invention relates to a device for clamping substantially cylindrical large containers such as drums for transporting the container.

BACKGROUND OF THE INVENTION

Trucks for transporting cylindrical large containers such as drums one by one are equipped, on a lift frame on the wheeled frame thereof, with a body support device for supporting the body of the container in clamping engagement therewith or with a clamp device for clamping the upper end rim of the container with an upper claw and a lower claw. The container is clamped and embraced by the support device or clamped at its rim by the clamp device, and then transported as lifted off the floor to the contemplated location.

The container can be supported with higher stability when clamped at its body portion with a pair of claw plates than when clamped at its rim with the upper and lower claws. However, the former device has the problem of necessitating cylinder means for moving the claw plates toward and away from each other and a drive source for the cylinder means. It is also cumbersome to operate the cylinder means every time the body of container is to be clamped for supporting.

OBJECT OF THE INVENTION

The main object of the present invention is to provide a clamping device adapted to clamp the body of container as by embracing when merely pushed against the container and to release the container when retracted therefrom while slightly lowering, without necessitating any cylinder means or other drive source.

SUMMARY OF THE INVENTION

The present invention provides a device for clamping containers which comprises a support frame positionable around the container to be clamped over approximately one-half of the circumference thereof, a pair of substantially horizontal support rods provided on the inner side of the frame in the vicinity of respective opposite ends thereof, and a pair of claw plates mounted on the respective support rods upwardly and downwardly rotatable. The support rods extend away from each other in a horizontal plane toward their front ends. The claw plates have inwardly curved edges opposed to each other for the body of the container to partly fit in and each have an upper surface positioned at a higher level than the support rod. The shortest distance between the claw plates through the center of the container to be clamped corresponds to the diameter of the container body, and the distance between the front ends of the claw plates is smaller than the diameter of the container body.

DESCRIPTION OF THE PREFERRED EMBODIMENT

Figure 1:
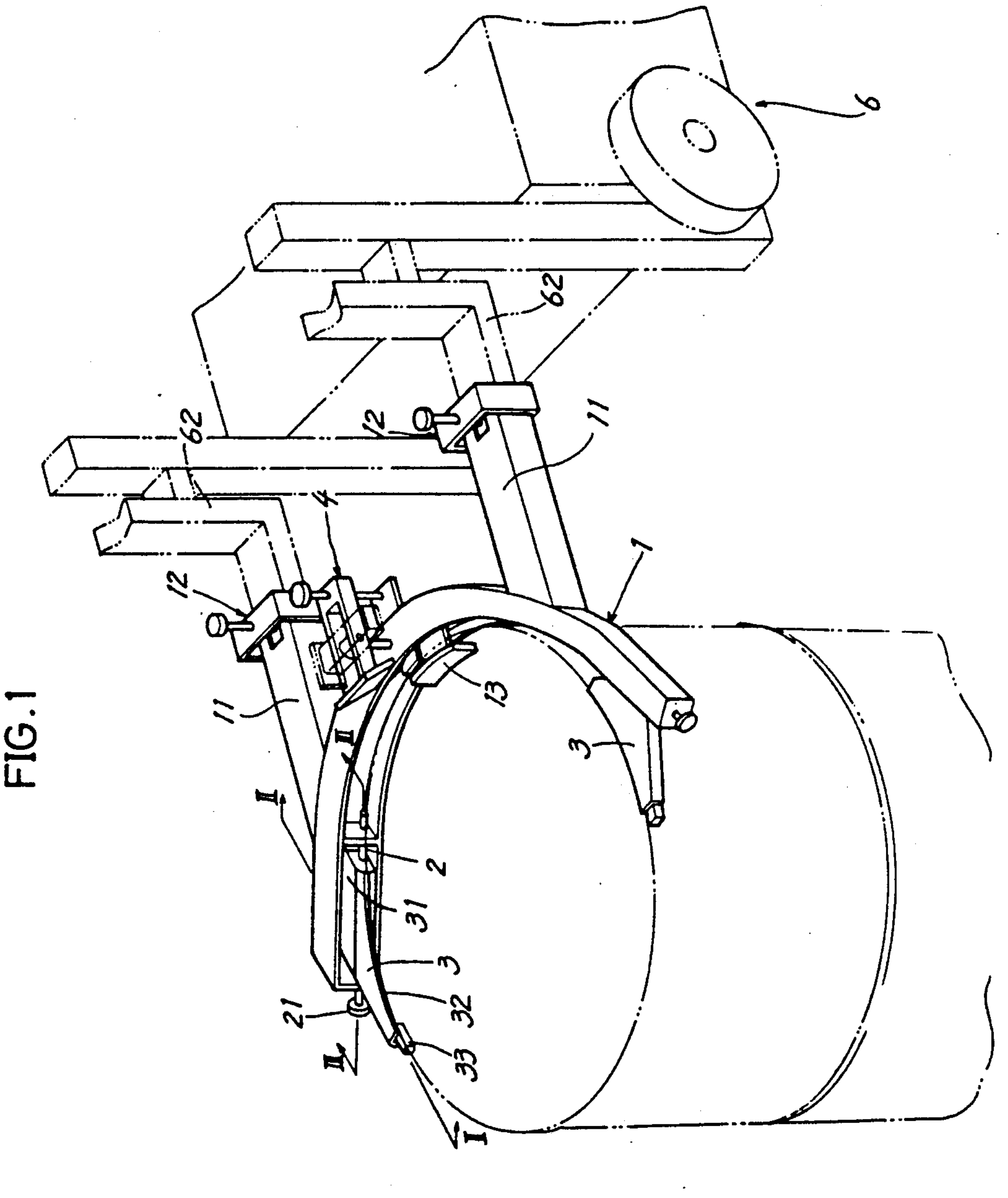
FIG. 1 is a perspective view showing a container clamping device embodying the present invention.
Figure 2:
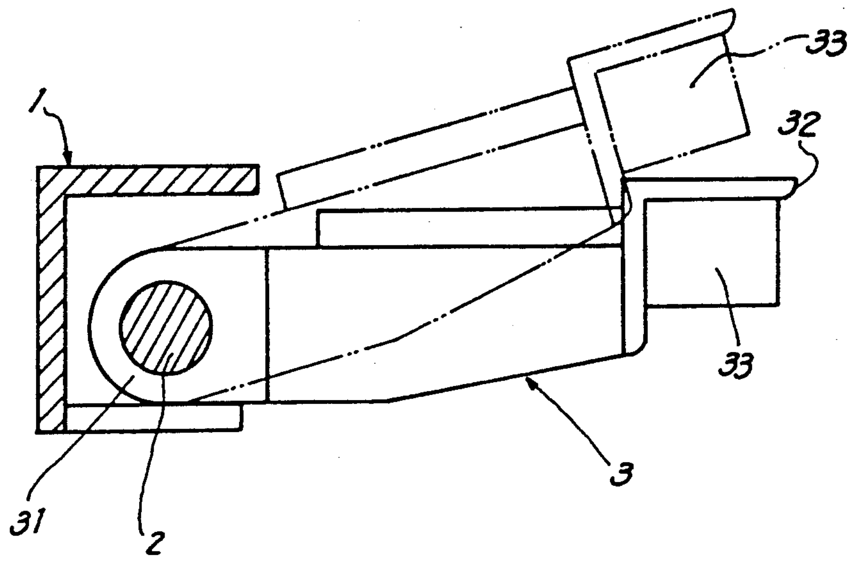
FIG. 2 is a view in section taken along the line II—II in FIG. 1.
Figure 3:
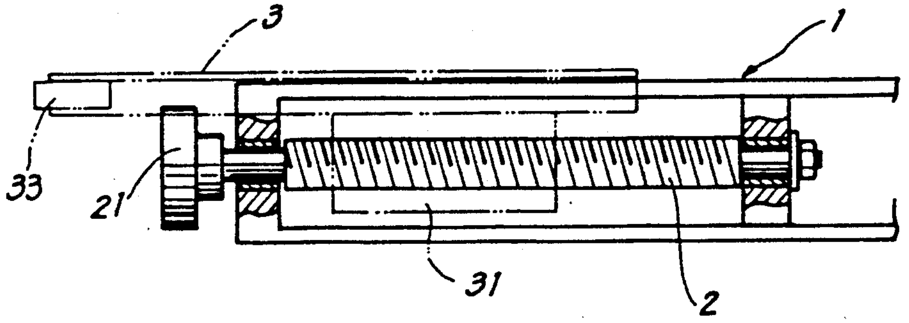
FIG. 3 is a view in section taken along the line III—III in FIG. 1.

A clamping device embodying the present invention will be described below which is to be used as attached to a forklift.

The container 5 to be clamped by the device of the invention is a substantially cylindrical large container such as a drum and has a rim 52 along the outer periphery of its upper end and a reinforcing annular rib 53 on its body 51. The rim 52 and the rib 53 are protuberant.

The clamping device clamps the container 5 in engagement with the rim 52 or the annular rib 53 and comprises a support frame 1 so shaped as to be positionable around the container 5 over approximately one-half of its circumference. For example, the frame 1 is semicircular, generally V-shaped or substantially U-shaped. The support frame 1 is provided with a pair of sheaths 11 for the fork 62 of a forklift 6 to fit in, and with a pair of claw plates 3.

The term "front" as used herein refers to the opening side of the support frame 1, i.e., to the side of the device where the container is to be received.

The sheaths 11 are positioned in the vicinity of respective opposite ends of the support frame 11 and extend rearward from the frame 1 in parallel to each other. A clamp 12 is provided at the rear end of each sheath 11 for clamping the fork 62 to be fitted in the sheath.

The pair of claw plates 3, 3 are disposed at the respective ends of the support frame 1 on the inner side thereof and are rotatable upward and downward, i.e., to a raised position and to a horizontal position. Each claw plate 3 has a slide block 31 at its base end.

A support rod 2 extending longitudinally of the support frame 1 is supported by the frame 1 and positioned close to each frame end. The support rod 2 is externally threaded and extends through the slide block 31 of the claw plate 3 in screw-thread engagement therewith to rotatably support the base end of the claw plate 3.

Figure 7:
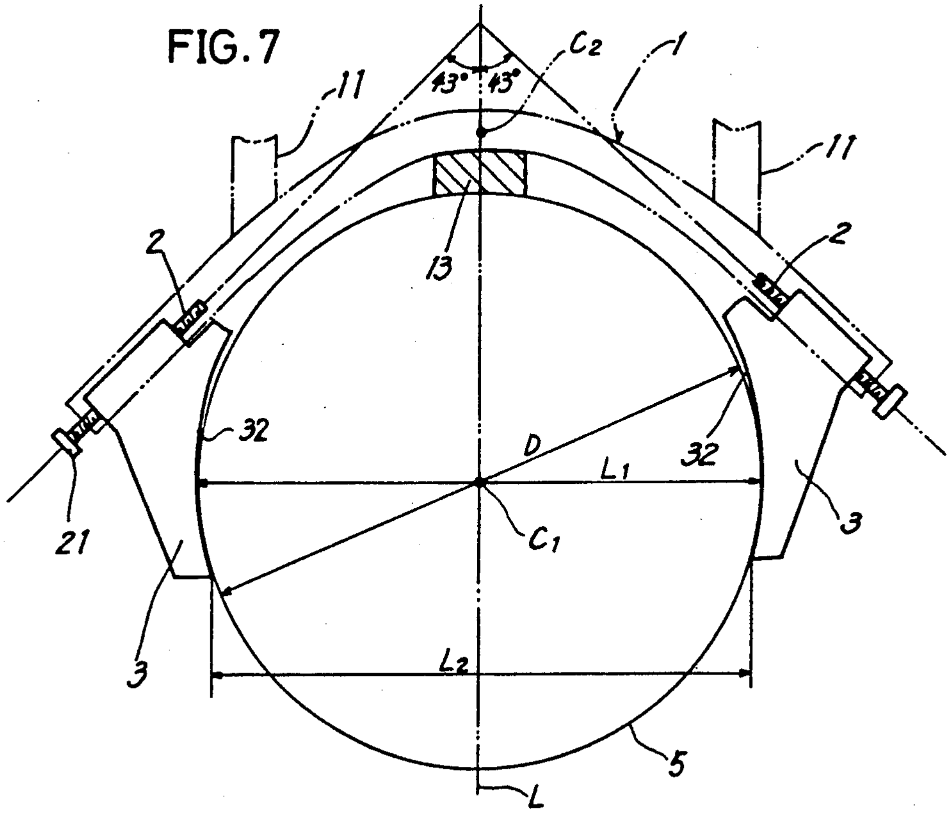
FIG. 7 is a diagram illustrating the distance between the claw plates relative to the diameter of the container, and the position of contact of the claw plates with the container relative to the angle of rotatable support rods.

As shown in FIG. 7, the axis of the support rod 2 is positioned at an angle of slightly smaller than 45 degrees with respect to a phantom line L through the center $C_1$ of the container 5 to be clamped and through the center $C_2$ of the support frame 1. This angle is 43 degrees according to the present embodiment.

The rotatable support rod 2 has a handle 21 projecting from its front end and rotatable with hand. The handle 21, when rotated, moves the plate 3 forward or rearward along the support rod 2 by virtue of the thrust afforded by the screw of the rod 2.

The front free ends of the two claw plates 3, 3 project forward beyond the front ends of the support frame 1 and also toward each other. Each claw plate 3 including the projection has an inner edge which is inwardly curved in the form of a circular arc in conformity with the curvature of the body 51 of the container 5.

The portion of the claw plate 3 providing the inner edge has an upper surface positioned at a higher level than the rotatable support rod 2 for the plate 3.

The claw plate 3 has a short auxiliary claw 33 projecting from its front end and made of an elastic material (such as urethane rubber). As will be described later, the auxiliary claw 33 precludes the claw plate 3 from defacing the container 5 by direct striking contact therewith.

The support frame 1 is provided on the inner side of its midportion with a contact plate 13 adapted to contact the rear side of the body 51 of the container 5.

As seen in FIG. 1, the support frame 1 is provided on the top of its midportion with a gripping assembly 4 for gripping the upper end of the container 5 as clamped by the pawl plates 3, 3 in order to assist in supporting the container 5.

Figure 8:
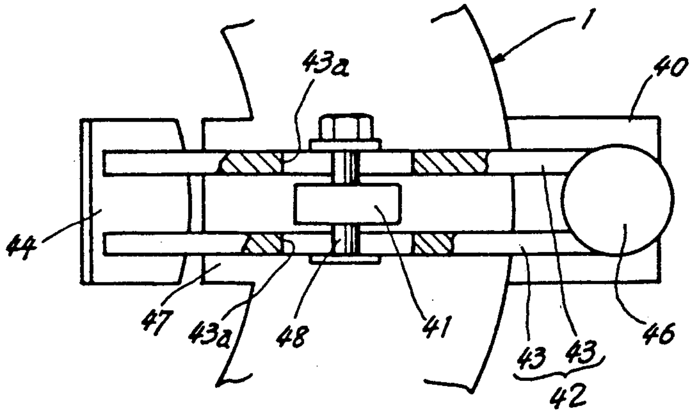
FIG. 8 is a plan view partly broken away and showing a gripping assembly.
Figure 9:
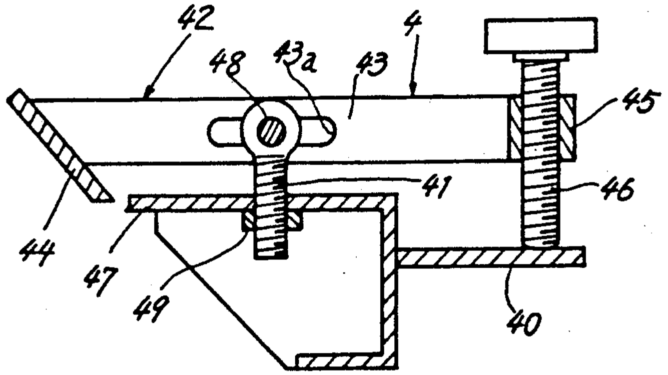
FIG. 9 is a side elevation showing the same in vertical section.

With reference to FIGS. 8 and 9, the gripping assembly 4 includes a prop 41 extending through the support frame 1 and adjustable in height. A pivotal lever 42 is supported by the upper end of the prop 41 and is pivotally movable in a vertical plane.

The prop 41 has a lower portion in the form of a screw extending through the frame 1 in screw-thread engagement therewith and fastened to the frame 1 with a locknut 49, which is screwed on the prop from inside the frame 1.

The level of the prop 41 is adjustable by loosening the locknut 49 and rotating the prop 41.

The pivotal lever 42 comprises a pair of parallel plates 43, 43 with a spacing provided therebetween, an upper claw 44 attached to both the front ends of the plates 43, 43 and extending obliquely rearwardly downward, and a block 45 interconnecting the base ends of the plates 43, 43 and having a clamp screw 46 extending therethrough in screw-thread engagement therewith.

The plates 43 of the pivotal lever 42 are each formed with a horizontally elongated slot **43*a*. The upper end of the prop 41 is loosely fitted in the space between the plates 43. A pivot 48 projecting from the prop horizontally is slidably fitted in the slots 43*a* of the plates 43**.

The midportion of the support frame 1 has a lower claw 47 projecting forward as opposed to the upper pawl 44, and a support plate 40 projecting rearward as opposed to the clamp screw 46.

When the clamp screw 46 is turned to press the screw end against the support plate 40, the pivotal lever 42 moves about the pivot 48 to lower the upper claw 44, whereby the rim 52 at the upper end of the container 5 can be gripped by the upper claw 44 and the lower claw 47.

The pivotal lever 42 is movable forward or rearward by an amount corresponding to the length of the slots **43*a* so that container rims of varying thicknesses can be held by the gripping assembly 4**.

The gripping assembly 4 is used as auxiliary means, for example, when the forklift 6 is driven on a slanting floor. Usually, the pivotal lever 42 is held in a standby position as directed transversely of the device by loosening the clamp screw 46 and the locknut 49, so as not to interfere with the container as indicated in phantom line in FIG. 1.

With the present clamping device, the shortest distance $L_1$ between the two claw plates 3, 3 through the center $C_1$ of the container 5 to be clamped corresponds to the diameter D of the body 51 of the container 5. The distance $L_2$ between the front ends of the claw plates 3, 3 is smaller than the diameter of the container body 51.

The spacing between the claw plates 3 is adjusted in corresponding relation with the size of the container 5 by rotating the support rods 2 on the front ends of the support frame 1 and thereby moving the claw plates 3 obliquely forward or rearward.

The fork 62 of the forklift 6 is fitted into the sheaths 11 of the clamping device, which is then clamped to the fork 62 by clamps 12.

Figure 4A:
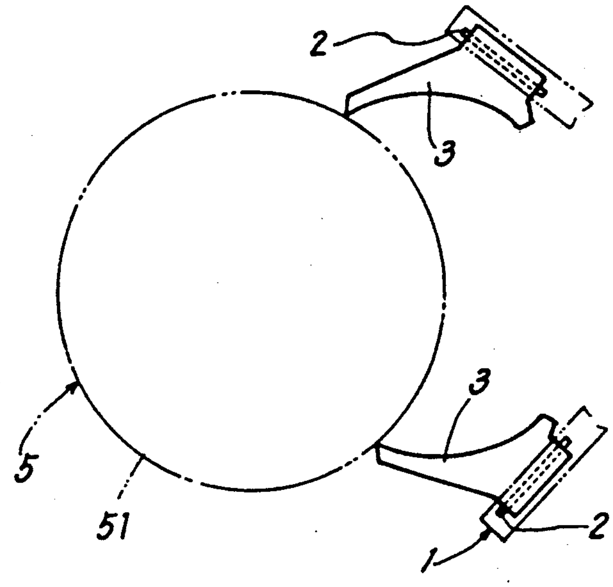
FIG. 4A is a diagram illustrating claw plates as seen from above when they are brought into contact with a container.
Figure 4B:
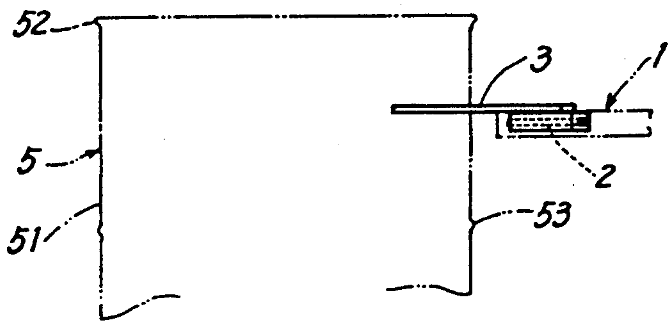
FIG. 4B is a diagram of the same as the claw plate is seen from one side.

With the support frame 1 positioned approximately in parallel to the floor, the front ends of the claw plates 3 are pressed against an upper portion of the container 5 (FIG. 4A and FIG. 4B).

Figure 5A:
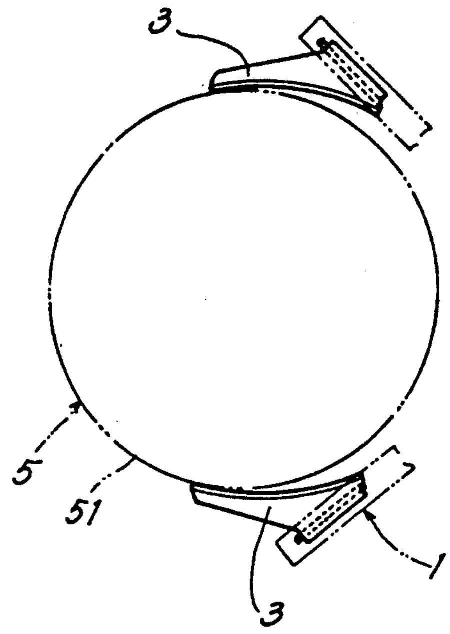
FIG. 5A is a diagram illustrating the claw plates as seen from above when they are being raised in contact with the peripheral surface of the container.
Figure 5B:
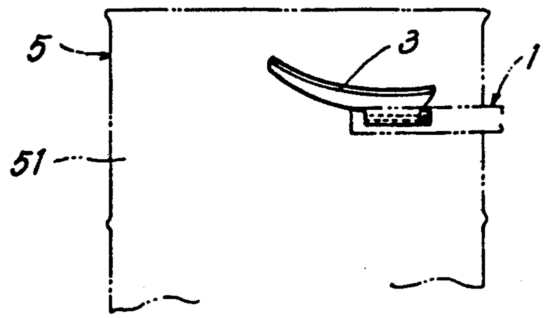
FIG. 5B is a diagram of the same as the claw plate is seen from one side.

The supporte frame 1 is further advanced in this state. Although the distance $L_2$ between the front ends of the claw plates 3 is smaller than the diameter D of the body 51 of the container 5, the rotatable support rods 2 for the respective claw plates 3 are positioned at a lower level than the front ends of the claw plates 3, and the rotatable support rods 2 extend away from each other in a horizontal plane toward their front ends. Consequently, the front end of each claw plate 3 is subjected to a component of force which acts to raise the plate end, by the pawl plate end being pressed against the peripheral surface of the container body 51. Thus, the front end of each claw plate 3 is gradually raised in contact with the container body 51 (FIG. 5A and FIG. 5B).

Figure 6A:
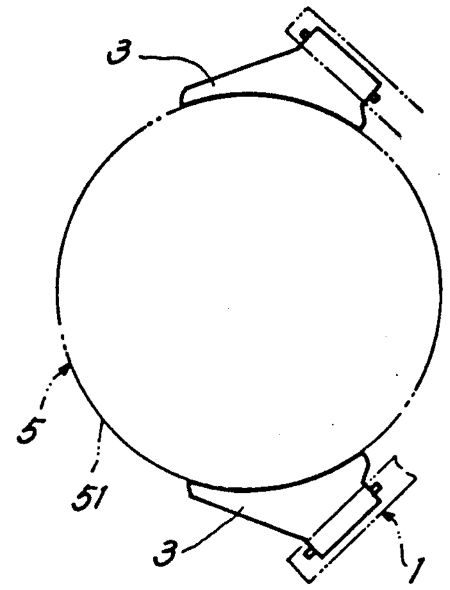
FIG. 6A is a diagram illustrating the claw plates as seen from above when the midpoint therebetween is in coincidence with the center of the container.
Figure 6B:
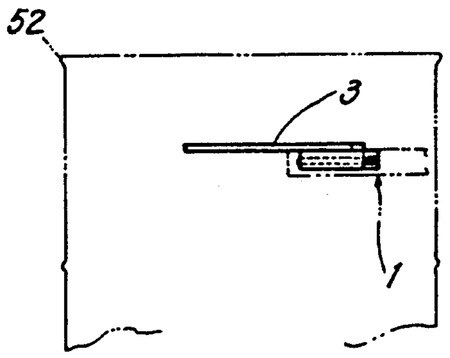
FIG. 6B is a diagram of the same as the claw plate is seen from one side.

When the front ends of the two claw plates 3, 3 have moved past a diametrical line of the container 5 as the support frame 1 advances, the midpoint between the claw plates 3, 3 coincides with the axis of the container 5. At this time, the two claw plates 3, 3 are positioned along the body 51 of the container 5 (FIG. 6A and FIG. 6B).

When the support frame 1 is lifted in this state, the claw plates 3 are slidingly moved upward along the container body 51 into engagement with the rim 52 at the upper end of the container 5 and raise the container 5.

With the foregoing embodiment, the axis of each rotatable support rod 2 is positioned at an angle of slightly smaller than 45 degrees (e.g., 43 degrees in the embodiment) with respect to the phantom line L through the center $C_1$ of the container 5 to be clamped and through the center $C_2$ of the support frame 1. Accordingly, when the container 5 is clamped between the two claw plates 3 in the case where the circular-arc inner edges of the claw plates 3 are smaller than the container body 51 in curvature as seen in FIG. 7, the claw plates 3 come into contact with the container with a greater force toward their forward ends than at their rear ends to effectively press the container 5 into contact with the contact plate 13. As a result, the container 5 can be supported with increased stability by contact with three portions, i.e. the front ends of the claw plates 3, 3 and the contact plate 13.

After the container 5 has been lowered at the contemplated location, the support frame 1 is retracted from the container 5, whereby the claw plates 3 are retracted while their front ends are being raised in contact with the container 5 to release the container from the claw plates 3, 3.

If the claw plates 3, 3 are pressed against the container 5 or the container 5 is released from the claw plates 3, 3 while lowering the support frame 1, the front ends of the claw plates 3, 3 remain unchanged in level owing to the friction between the container 5 and the claw plates 3, 3, allowing the claw plate base ends to lower, with the result that the claw plates 3 can be brought to their raised position with greater ease to clamp or release the container 5 more smoothly.

Although the clamping device of the invention described above is used as attached to the forklift, it is of course usable as coupled to a lift device mounted on a hand truck.

What is claimed is:

1. A device for clamping a container having a body, a circumference, a center and a diameter comprising:

a support frame having a first free end and a second free end and positionable around the container to be clamped over approximately one-half of the circumference thereof.

a pair of support rods provided respectively on the first end and the second end of the support frame, each of said support rods having a front end and extending in a generally horizontal plane and generally longitudinally of the support frame so that said support rods extend away from each other and have a distance therebetween which increases toward their respective said front end, and a pair of claw plates, each having a front end and being mounted on the respective support rods being upwardly and downwardly rotatable and having inwardly curved edges opposed to each other for the body of the container to partly fit in, each of the claw plates having an upper surface positioned at a higher level than the support rod, the shortest distance between the pair of claw plates through the center of the container to be clamped corresponding to the diameter of the container body, the distance between said front end of said each claw plate being smaller than the diameter of the container body, and said each support rod being rotatably mounted on the support frame and externally threaded, and said each claw plate having a slide block at its base end with the support rod extending through the slide block in screw-thread engagement therewith to rotatably support the base end of the class plate, which claw plates are adjustable with respect to the distance therebetween by rotating the support rods, depending upon the size of the container.

2. A device for clamping a container having a body, a circumference, a center and a diameter comprising:

a support frame having a first free end and a second free end and positionable around the container to be clamped over approximately one-half of the circumference thereof, a pair of support rods provided respectively on the first end and the second end of the support frame, each of said support rods having a front end and extending in a generally horizontal plane and generally longitudinally of the support frame so that said support rods extend away from each other and have a distance therebetween which increases toward their respective said front end, and a pair of claw plates, each having a front end and being mounted on the respective support rods being upwardly and downwardly rotatable and having inwardly curved edges opposed to each other for the body of the container to partly fit in, each of the claw plates having an upper surface positioned at a higher level than the support rod, the shortest distance between the pair of claw plates through the center of the container to be clamped corresponding to the diameter of the container body, the distance between said front end of said each claw plate being smaller than the diameter of the container body, and said each claw plate having an auxiliary claw projecting from its frond end longitudinally of said claw plate in said horizontal plane, and made of an elastic material.

3. A device for clamping a container having a body, a circumference, a center and a diameter comprising:

a support frame having a first free end and a second free end and positionable around the container to be clamped over approximately one-half of the circumference thereof, a pair of support rods provided respectively on the first end and the second end of the support frame, each of said support rods having a front end and extending in a generally horizontal plane and generally longitudinally of the support frame so that said support rods extend away from each other and have a distance therebetween which increases toward their respective said front end, and a pair of claw plates, each having a front end and being mounted on the respective support rods being upwardly and downwardly rotatable and having inwardly curved edges opposed to each other for the body of the container to partly fit in, each of the claw plates having an upper surface positioned at a higher level than the support rod, the shortest distance between the pair of claw plates through the center of the container to be clamped corresponding to the diameter of the container body, the distance between said front end of said each plate being smaller than the diameter of the container body, and said support frame being provided on the inner side of its midportion with a contact plate adapted to contact the rear side of the body of the container to be clamped.

4. A device as defined in claim 1 wherein the support frame has a pair of sheaths extending rearward in parallel to each other for the fork of a forklift to fit in.

5. A device as defined in claim 1 wherein the support frame is provided on the top of its midportion with a gripping assembly for gripping the upper end of the clamped container to assist in supporting the container.

6. A device as defined in claim 1, wherein said support frame consists of a relative rigid, non-movable one-piece integral member which is arranged in a relatively continuous arc in said horizontal plane when viewed in plan view.

7. A device for a clamping container comprising:

a support frame having a first free end and a second free end and positionable around the container to be clamped over approximately one-half of the circumference thereof, a pair of support rods, each having a front end and being provided respectively on the first end and the second end of the support frame and extending away from each other in a horizontal plane toward their respective said front end, and a pair of claw plates, each having a front end and being mounted on the respective support rods upwardly and downwardly rotatable and having inwardly curved edges opposed to each other for the body of the container to partly fit in, each of the claw plates having an upper surface positioned at a higher level than the support rod, the shortest distance between the pair of claw plates through the center of the container to be clamped corresponding to the diameter of the container body, the distance between the front ends of the claw plates being smaller than the diameter of the container body, and, said support rods, each being rotatably mounted on the support frame and externally threaded, and said claw plate having a slide block at its base end, the support rod extending through the slide block in screw-thread engagement therewith to rotatably support the base end of the claw plate, the claw plates being adjustable with respect to the distance therebetween by rotating the support rods, depending upon the size of the container.

8. A device for clamping container comprising:

a support frame having a first free end and a second free end and positionable around the container to be clamped over approximately one-half of the circumference thereof, a pair of support rods each having a front end and provided respectively on the first end and the second end of the support frame and extending away from each other in a horizontal plane toward their respective said end, and a pair of claw plates each having a front end and being mounted on the respective support rods upwardly and downwardly rotatable and having inwardly curved edges opposed to each other for the body of the container to partly fit in, each of the claw plates having an upper surface positioned at a higher level than the support rod, the shortest distance between the pair of claw plates through the center of the container to be clamped corresponding to the diameter of the container body, the distance between the front ends of the claw plates being smaller than the diameter of the container body, and said support frame being provided on the inner side of its midportion with a contact plate adapted to contact the rear side of the body of the container to be clamped.

9. A device as defined in claim 2, wherein the support frame has a pair of sheaths extending rearward in parallel to each other for a fork of a forklift to fit in.

10. A device as defined in claim 2, wherein the support frame is provided on a top of its midportion with a gripping assembly for gripping an upper end of the clamped container to assist in supporting the container.

11. A device as defined in claim 2, wherein said support frame consists of a relatively rigid, non-movable one-piece integral member which is arranged in a relatively continuous arc in said horizontal plane when viewed in plan view.

12. A device as define din claim 3, wherein the support frame has a pair of sheaths extending rearward in parallel to each other for a fork of a forklift to fit in.

13. A device as defined in claim 3, wherein the support frame is provided on a top of its midportion with a gripping assembly for gripping an upper end of the clamped container to assist in supporting the container.

14. A device as defined in claim 3, wherein said support frame consists of a relatively rigid, non-movable one-piece integral member which is arranged in a relatively continuous arc in said horizontal plane when viewed in plan view.

* * * * *